Aug. 2, 1955  R. M. SCHULTZ  2,714,337
TRIMMING MACHINE
Filed Jan. 10, 1952  5 Sheets-Sheet 1

INVENTOR.
Roy M. Schultz
BY
Thiess, Olsen & Mecklenburger
Attys.

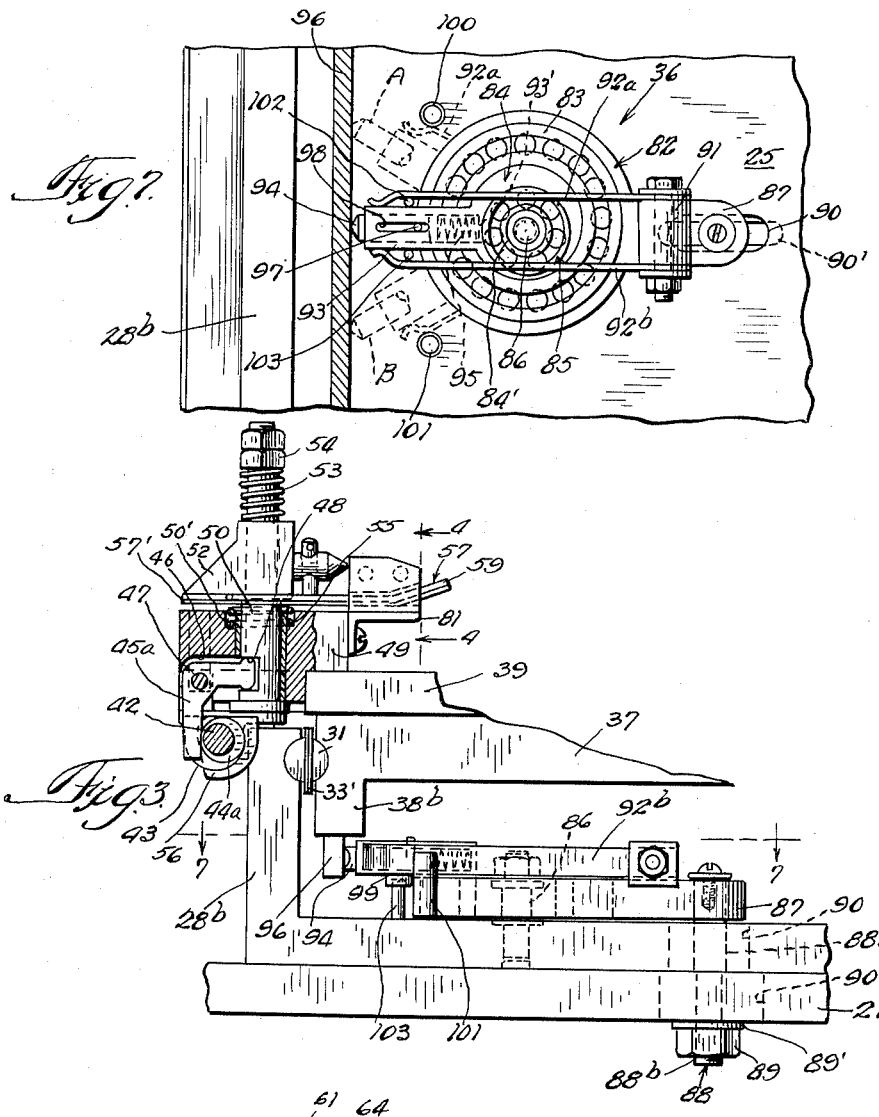

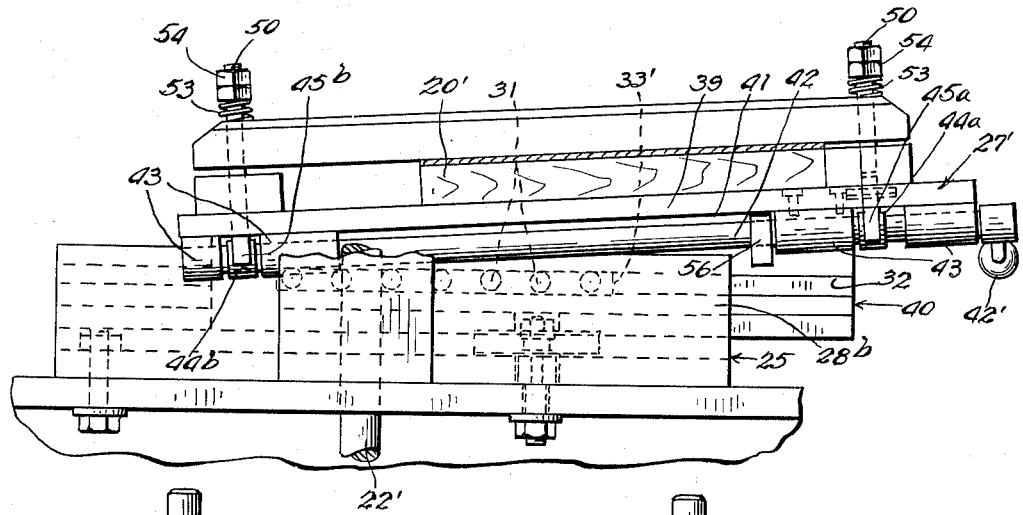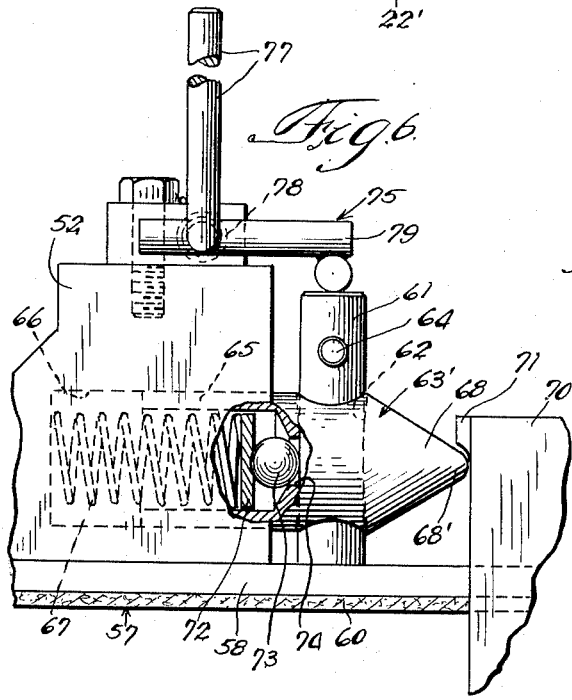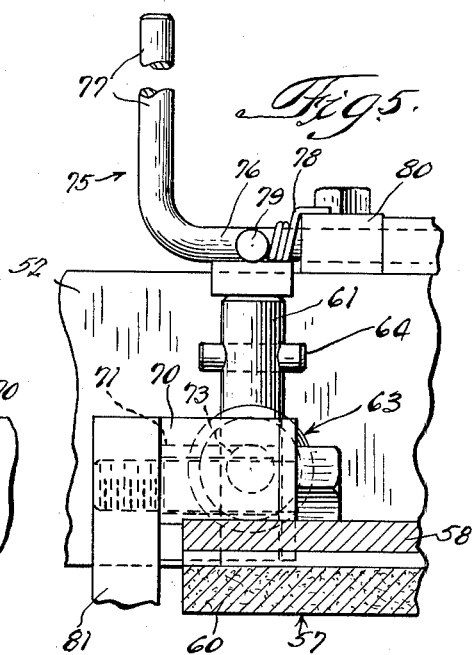

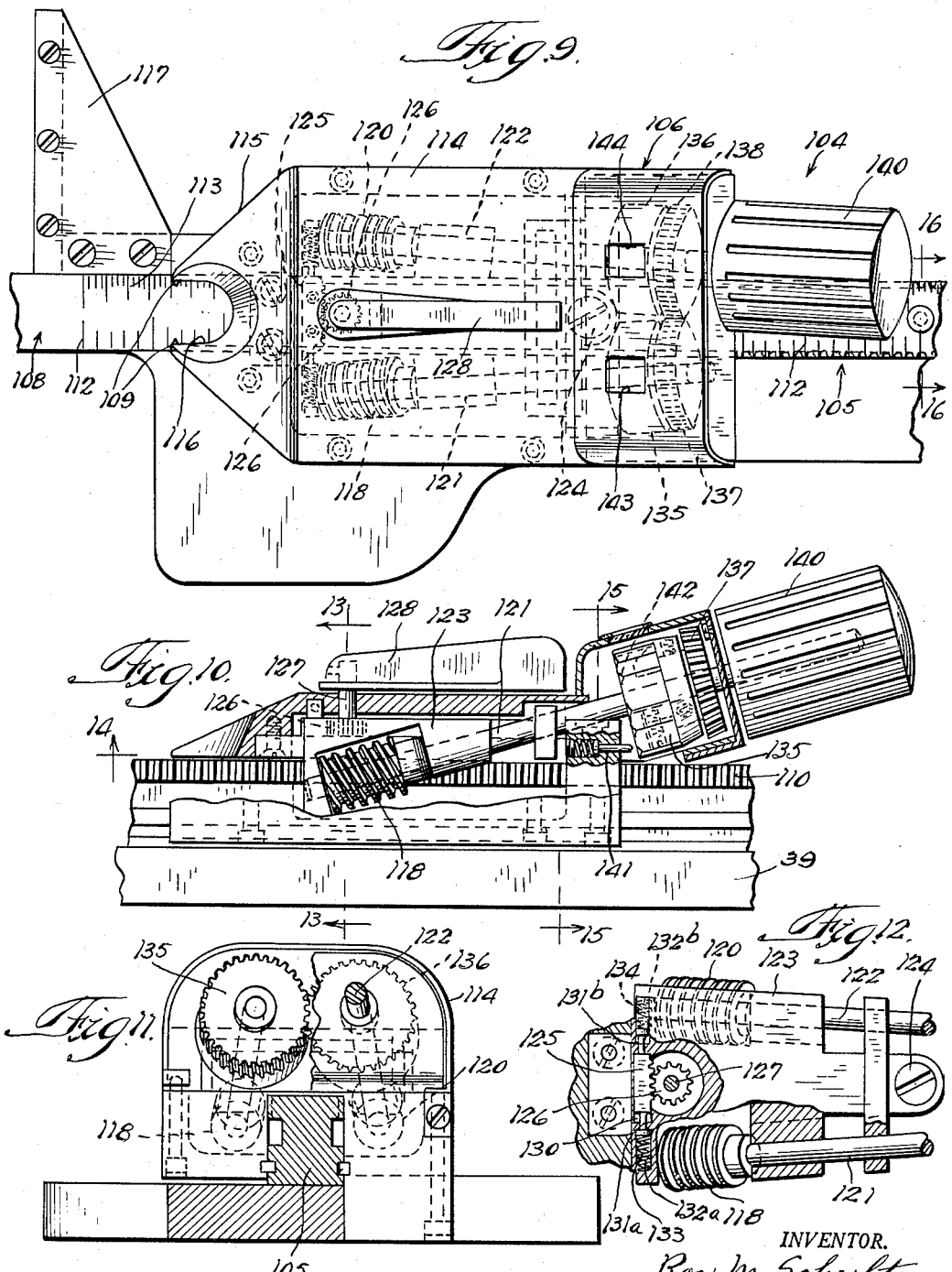

Aug. 2, 1955    R. M. SCHULTZ    2,714,337
TRIMMING MACHINE
Filed Jan. 10, 1952    5 Sheets-Sheet 5
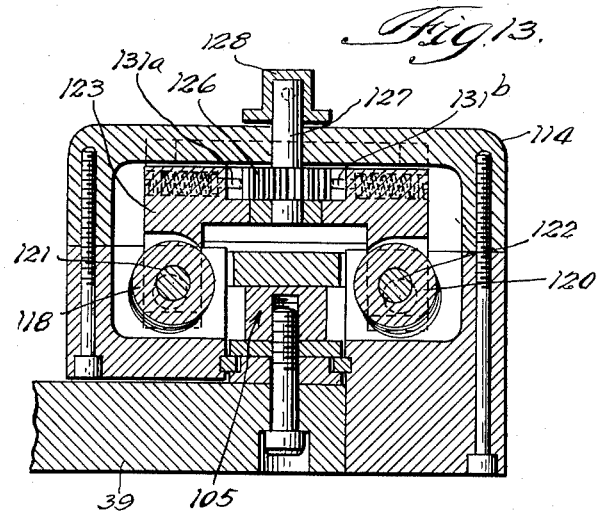
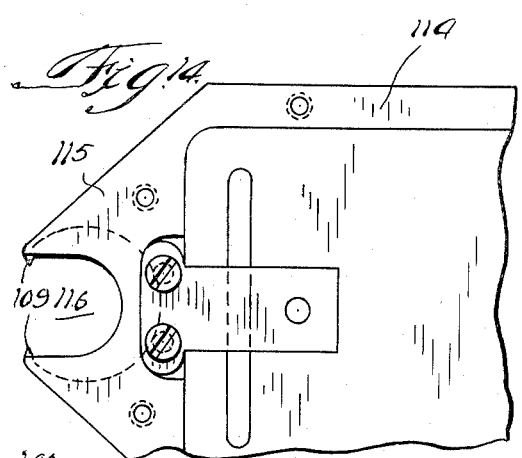
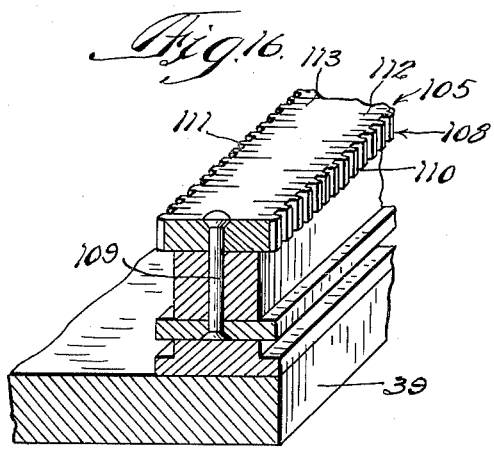
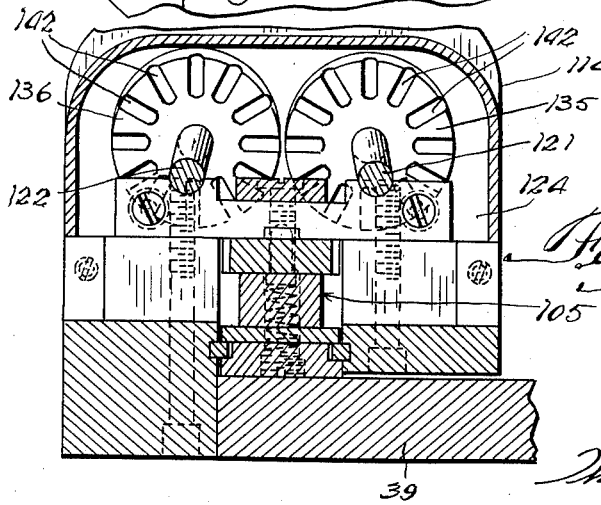
INVENTOR.
Roy M. Schultz
BY
Thiess, Olson & Mecklenburger
Attys.

United States Patent Office 2,714,337
Patented Aug. 2, 1955

2,714,337

TRIMMING MACHINE

Roy M. Schultz, Chicago, Ill., assignor to Pontiac Engraving & Electrotype Co., Chicago, Ill., a corporation of Illinois Application January 10, 1952, Serial No. 265,849

10 Claims. (Cl. 90—19)

This invention relates to a trimming machine for use primarily in the graphic arts industry, such as photoengraving and electro-typing establishments, where accurate trimming of wood-mounted printing plates of all kinds to specified dimensions is required.

The accuracy of the trimming is important in order to facilitate subsequent mounting of the plate with type in a chase for a printing press.

Various trimming machines have heretofore been proposed which are possessed of many disadvantage. For example, the machines (a) cause a burr to be formed on the printing surface of the plate thereby interfering with the kissing of the plate on the material to be printed, (b) cause the trimmed edges of the plate to be rough thereby interfering with mounting of the plate with type in a chase, (c) are difficult and awkward to manipulate in order to effect accurate trimming of the plates, and (d) are of complex and costly construction thereby restricting the use of such machines to primarily the relatively large photoengraving and electro-typing establishments.

Thus it is one of the objects of this invention to provide a trimming machine which will enable a printing plate to be quickly, yet accurately, trimmed to specified dimensions.

It is a further object of this invention to provide a trimming machine which will not cause a burr to be formed on the printing surface of the plate and will cause the trimmed edges thereof to have smooth finished surfaces and thereby facilitate mounting of the plate in the chase of a printing press.

It is a still further object of this invention to provide a trimming machine which does not require a person skilled in the art to effect proper operation thereof.

It is a still further object of this invention to provide a trimming machine which prolongs the effective life of the cutting tool, thereby reducing the cost of maintenance and operation.

It is a still further object of this invention to provide a trimming machine which is simple in construction, effective in operation, and is inexpensive to produce.

Further and additional objects will appear from the description, accompanying drawings, and appended claims.

In accordance with one embodiment of this invention a machine is provided comprising a frame, a cutter rotatably mounted thereon, a bed mounted on said frame adjacent said cutter, and a work carrier slidably mounted on said bed for linear movement past said cutter. Mounted on the frame and bed and contacting the work carrier is a means for effecting lateral movement of said carrier into and out of work-trimming relation with said cutter upon linear movement of said carrier past said cutter.

For a more complete understanding of this invention reference should be made to the drawings, wherein Figure 1 is a top plan view of the machine showing the work carrier in its initial starting position;

Fig. 3 is an enlarged fragmentary sectional view taken along line 3—3 of Fig. 1;

Fig. 4 is a fragmentary view taken along line 4—4 of Fig. 3;

Fig. 5 is similar to Fig. 4 but showing one form of a work sighting unit;

Fig. 6 is a fragmentary left end view of the unit shown in Fig. 5;

Fig. 7 is a fragmentary top plan view of the back-off mechanism for the bed and work carrier;

Fig. 8 is a fragmentary side elevational view of a modified form of work carrier;

Fig. 9 is an enlarged fragmentary top plan view of the work-aligning mechanism;

Fig. 10 is an enlarged fragmentary sectional view taken along line 10—10 of Fig. 9;

Fig. 11 is a fragmentary sectional view taken along line 11—11 of Fig. 10;

Fig. 12 is a fragmentary plan view partially in section of a portion of the work-aligning mechanism;

Fig. 13 is a fragmentary sectional view taken along line 13—13 of Fig. 10;

Fig. 14 is a fragmentary sectional view taken along line 14—14 of Fig. 10;

Fig. 15 is a fragmentary sectional view taken along line 15—15 of Fig. 10;

Fig. 16 is an enlarged fragmentary sectional view taken along line 16—16 of Fig. 9.

Figure 1:
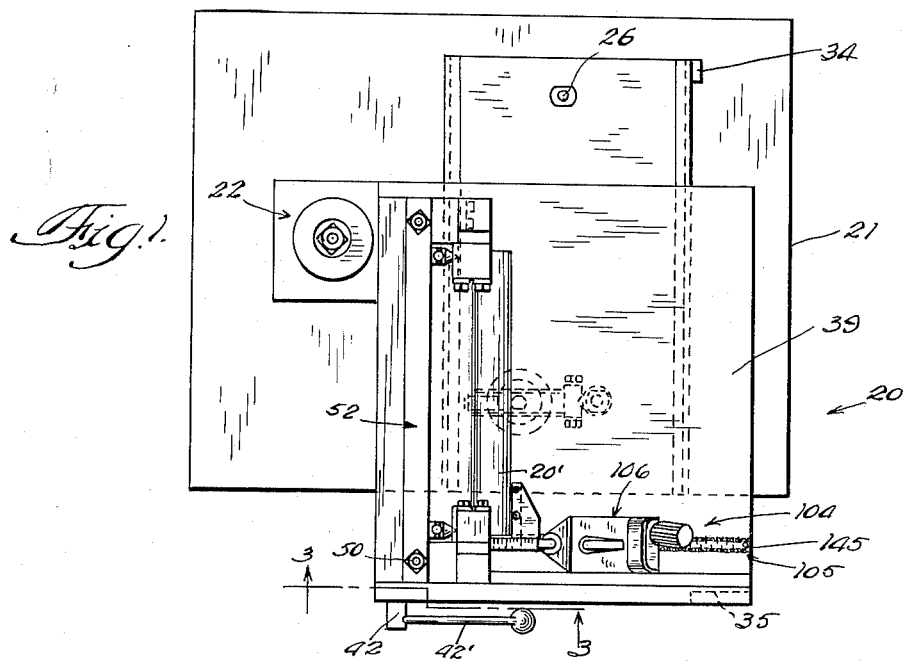
Figure 2:
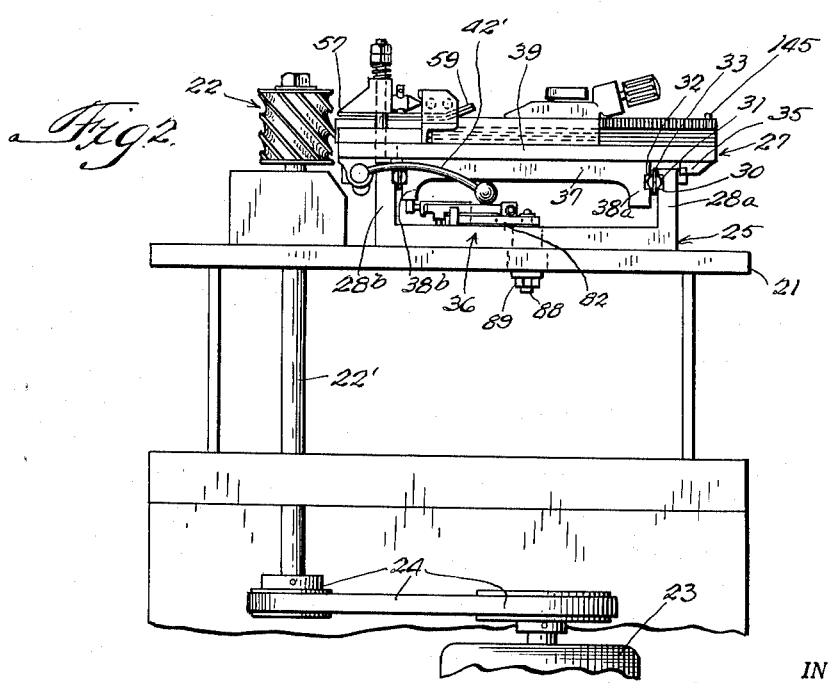
Fig. 2 is a front view of the machine shown in Fig. 1.

Referring now to the drawings, and more particularly to Figs. 1 and 2, a hand operated trimming machine 20 for use in trimming wood-mounted printing plates 20' to specific dimensions is provided, comprising a table or frame 21, a cutting tool 22 mounted on an upright spindle 22', the latter being rotatably mounted on said frame, a bed 25 pivotally mounted at point 26 on said frame 21, and a work carrier 27 slidably mounted on the bed 25 for linear movement past the cutting tool 22.

The spindle 22' for the cutting tool 22 is driven by a conventional uni-directional motor 23 which is mounted on the underside of frame 21. The drive shaft of the motor 23 is operatively connected by a belt and pulley combination 24 to the lower end of the spindle 22'.

The bed 25, as above mentioned, is pivotally mounted at point 26 to the frame 21 and is adapted to be initially adjusted laterally, or in a horizontal plane, into close proximity with respect to the cutting plane of the tool 22. The bed 25 is provided with a pair of parallel upright flanges 28a and 28b which form ways on which the work carrier 27 slides. The inner or opposing surface of each flange is provided with an elongated groove 30 in which is rotatably mounted a plurality of ball bearings 31. The ball bearings 31 are disposed between depending guides 38a and 38b formed on the underside of the work carrier 27 and the upright flanges of the bed. A longitudinal groove 32 is formed in each of the depending guides 38a and 38b and is adapted to receive the ball bearings 31.

The ball bearings, as seen more clearly in Fig. 8, are held in spaced relation with respect to one another by a rack 33'. The length of rack 33' is such that when the carrier 27 is at each terminal of its sliding movement, the ball bearings will remain disposed between the upright flanges of the bed 25 and the depending guides of the carrier 27.

Flange 28a of the bed is provided at its far end with a stop 34 which is adapted to be engaged by a corresponding stop 35 mounted on the underside of the carrier 27, when the latter is in its full forward position relative to the bed. The stop 34 limits the forward movement of the carrier relative to the bed.

Disposed within the well formed between the flanges 28a and 28b of bed 25 is the back-off mechanism 36, which effects lateral relative movement of the carrier 27 into and out of work cutting relation with respect to the tool 22. When the carrier 27 is in its work-cutting relation, one edge of the work piece 20' is disposed in the cutting plane of the tool 22. The back-off mechanism 36 will be described in more detail hereinafter.

The work carrier 27 comprises a flat work-supporting plate 39 and guides 38a and 38b mounted on the underside thereof and extending downwardly therefrom, see Fig. 2. The guides, as heretofore mentioned, are provided with elongated grooves 32 which are adapted to receive the ball bearings 31.

A modified form of work carrier 27' is shown in Fig. 8 wherein the portions of the guides engaging the underside of the plate 39 are both inclined downwardly a slight amount from the front to rear of the carrier. Thus, due to this inclination of the plate 39, the work 20', when it passes the cutting tool 22, will cause a substantial portion of the periphery of the cutting tool to be engaged by the work thereby effecting greater axial distribution of the cutting load along the cutting surface of the tool.

Mounted on the underside of work supporting plate 39 of carrier 27 and along the edge thereof adjacent the cutting tool 22 is a clamp-actuating shaft 42. The shaft is supported at either ends by pairs of bearings 43 which are mounted on the underside of the carrier. The shaft 42 is of substantially the same length as the corresponding side of the work supporting plate 39. Mounted on shaft 42 and disposed intermediate each pair of bearings 43 are cams 44a and 44b respectively. The cams move as a unit and are adapted to cooperate with bell crank followers 45a and 45b, respectively, which are pivotally mounted at points 47, to the underside of the plate 39 as seen more clearly in Fig. 3. The free ends of the followers are seated within slots 48 formed in the shanks of a pair of guide posts 50, one of the latter being mounted adjacent each end of the shaft 42. Each post 50 extends through a suitable opening formed in the work supporting plate 39 and is disposed in an upright or perpendicular position with respect to said plate. The posts 50 are adapted to move in a longitudinal direction upon rotation of the bell crank followers 45a and 45b by the cams 44a and 44b. The upper end portion of each post 50 is embraced by a coil spring 53. A double nut 54 is threaded onto the upper end of the post 50 and holds the spring 53 in abutting relation with the upper surface of a clamp bar 52. The clamp bar 52 will be described more fully hereinafter. Thus, the downward movement of the posts 50 with respect to the work supporting plate 39 is yieldably transmitted to the clamp bar 52 through the double nut 54 and coil spring 53 and effects clamping of the work 20'.

Second coil springs 55 are disposed between the clamp bar 52 and rest blocks 49, the latter being mounted in spaced relation with respect to one another on the upper surface of the work supporting plate 39. One coil spring 55 embraces the shank of each post 50. A countersunk opening 50' is formed in each of the rest blocks 49 to receive one end of the spring 55. The springs 55 facilitate release of the clamp bar from its clamping position relative to the work 20'.

Mounted on the front end portion of shaft 42 and in longitudinally spaced relation with respect to cam 44a is a safety stop 56 (see Fig. 8) which, when the clamp bar is in its unclamped position, abuts the front edge of flange 28b of bed 25 and prevents forward movement of the work carrier relative to the bed. The stop 56 prevents turning of shaft 42 except when the carrier 27 is in its initial starting position as seen in Fig. 1. Thus, in order to move the carrier forward from its initial starting position it is necessary that the shaft 42 be rotated approximately 90° in a clockwise direction by a handle 42', affixed to the front end thereof, so as to cause the clamp bar 52 to assume a clamping position with respect to the work 20'. The shape of the safety stop 56 is such that it is moved out of the path of flange 28b, when the shaft 42 is rotated 90 degrees in a clockwise direction, thereby enabling the carrier 27 to be readily moved past the cutting tool 22.

The clamp bar 52 is substantially the same length as the edge of the plate 39 adjacent the cutting tool 22. The movement of the clamp bar 52 towards and away from the plate 39 is guided by a pair of guide posts 50.

The rest blocks 49 are rectangular in shape and are disposed beneath the end portions of the clamp bar 52 and limit the movement of the latter toward the upper surface of plate 39.

Disposed intermediate the underside of the clamp bar 52 and the upper surface of work supporting plate 39 and between the rest blocks 49 is a sighting unit 57. The sighting unit 57, as seen more clearly in Figs. 4, 5 and 6, comprises a metal plate 58 having a work-engaging layer 60 secured to the underside thereof. The layer 60 is constructed, preferably, of a soft resilient material, such as a nylon composition, which will yield to the pressure applied to the work 20' when the latter is clamped but will not cause any marring or scratching of the printing surface of the work 20' to occur, when the latter is being moved into and out of position beneath the sighting unit. One edge of the sighting unit 59, as seen more clearly in Figs. 2 and 3, is offset upwardly a slight amount so as to facilitate positioning of the work 20' beneath the sighting unit. Extending upwardly from the metal plate 58 of the sighting unit 57 is a guide stud 61 which extends through a suitable opening 62 formed in a follower 63. The stud 61 fits loosely in opening 62 so that the sighting unit 57 may move independently of the clamp bar 52 and align itself with the printing surface of the work 20'. To limit the downward movement of the sighting unit relative to the follower 63, a transversely extending pin 64 is formed at the upper end of stud 61.

The follower 63, as seen in Fig. 4, and the modified followers 63', seen in Figs. 5 and 6, are of substantially the same construction and have a hollow end portion 65, which is slidably mounted within a blind opening 66 formed in the adjacent side of the clamp bar 52, and an exposed end 68. The sliding movement of the follower 63 within the opening 66 is transmitted to the sighting unit 57 through the guide stud 61. Disposed within the opening 66 and between the end thereof and the corresponding hollow end of the follower is a coil spring 67 which causes the follower to normally assume an extended position relative to opening 66. In follower 63, one end of the spring 67 engages the interior of the hollow end portion of the follower, not shown. In follower 63', as seen in Fig. 6, the end of coil spring 67 engages a disk 72 positioned within the hollow end portion 65 of the follower. The disk 72 engages a metal ball 73 and urges the latter to seat in an aperture 74 formed in the central interior portion of the follower. The aperture 74 communicates with the hollow end portion 65 and the stud opening 62. The function of the ball 73 will become apparent hereinafter.

The exposed end 68 of each follower is conical in shape and the tip or nose 68' thereof is adapted to positively engage the adjacent surface of a cam plate 70 or a cam node 71, depending upon the relative position of the clamp bar 52 with respect to the work supporting plate 39.

The cam node 71 is mounted along the upper edge portion of the surface of the cam plate 70, adjacent the follower, and projects outwardly therefrom as seen in Fig. 6. When the cam node 71 is engaged by the nose 68' of the follower, the latter is retracted and causes the edge 57' of the sighting unit 57, adjacent the cutting tool 22, to be disposed in the tangential cutting plane of the tool. This latter disposition of the sighting unit 57 occurs when the clamp bar 52 assumes a fully unclamped position. When the clamp bar 52 is moved to its clamping position the nose 68' of the follower slides off the cam node 71 and contacts the adjacent surface of the cam plate 70, thereby enabling the follower 63 or 63' to assume its normally extended position, whereby the sighting edge 57' of the unit 57 is retracted from the cutting plane of the tool 22 and thereby prevents any interference by the sighting unit with the cutting of the work by the tool 22.

The steel ball 73, as heretofore mentioned, is adapted to frictionally engage the shank of stud 61, and causes the sighting unit 57 to move upwardly from the work 20' when the clamp bar 52 is raised to an unclamped position.

In the follower 63, no steel ball is provided and, thus, when the clamp bar is raised, the sighting unit will continue to rest on the upper surface of the work, not shown.

When the modified follower 63' is used, a bell crank lever 75 is provided which is pivotally mounted on the upper surface of clamp bar 52, as seen in Figs. 5 and 6. The bell crank lever is adapted to rotate about shaft 76 and move the sighting unit 57 independently of the clamp into supporting engagement with the printing surface of the work 20', when the latter is disposed beneath the bar. One leg 77 of the bell crank lever 75 extends upwardly from each end of shaft 76 and serves as a handle for manually effecting movement of the lever in a clockwise direction, as seen in Fig. 6. The other leg 79 of the bell crank lever 75 engages the top of stud 61. The bell crank lever is biased by spring 78 in a counterclockwise direction. A bearing 80 for bell crank lever 75 is mounted on the upper surface of clamp bar 52. The shaft 76 of bell crank lever 75 about which it pivots has a length substantially the same as the distance between guide posts 50 for the clamp bar.

Each of the cam plates 70, against which the nose of the followers abuts and on which the cam nodes 71 are mounted, are secured to the rest blocks 49, heretofore described, by brackets 81.

The back-off mechanism 36 (Figs. 3 and 7), as heretofore mentioned, is mounted within the well formed in bed 25, and comprises a bearing housing 82 having a ball bearing 83 which may be of conventional design, mounted concentrically within the main body portion of said housing, a cam member 84 mounted within the inner race of ball bearing 83, and a second ball bearing 85, eccentrically mounted within cam member 84. The inner race 84' of the second ball bearing 85 snugly engages a stud 86 which is threaded into bed 25.

The bearing housing 82 is provided with a laterally extending apertured tongue portion 87, through which the shouldered shank portion 88a of a bolt 88 extends. The threaded portion 88b of the bolt 88 passes through an opening in the frame 21 and is engaged by a nut 89 and washer 89' beneath the frame 21. The shouldered shank portion 88a of the bolt 88 extends through an elongated slot 90 formed in bed 25 and an elongated opening 90' formed in frame 21. The opening 90' enables the bed and carrier to be initially adjusted into close proximity to the cutting tool 22 particularly when tools having various outside diameters are used. Mounted on the upper side of tongue portion 87 of bearing housing 82 is a spring bracket 91 from which transversely extend substantially parallel leaf springs 92a and 92b, as seen in Fig. 7. The function of these leaf springs will become apparent hereinafter.

The cam member 84, as seen in Fig. 7, is provided with a laterally extending, hollow sleeve portion 93 in which a shoe 94 is mounted for reciprocatory movement. The shoe 94 normally assumes an extended position with respect to the sleeve portion 93 by means of a coil spring 95. One end of the spring 95 engages the blind end 93' of the hollow sleeve portion 93 and the other end engages the enclosed end of the shoe 94. The exposed end of shoe 94 abuts the side of a rail 96 which is rigidly mounted on the underside of flange or way 38b of the carrier 27 and is substantially the same length thereas. The movement of shoe 94 relative to sleeve 93 is limited by a transversely extending pin 97, mounted on the inner end of shoe 94, which extends through an elongated slot 98 formed on the upper side of sleeve portion 93.

The linear forward and rearward movement of the carrier 27 relative to the bed 25 is transmitted through rail 96 and shoe 94 to the cam member 84. When the carrier is moved forward relative to the bed, the frictional engagement between rail 96 and the abutting shoe 94 causes cam member 84 to rotate about stud 86 as an axis in a clockwise direction until the shoe reaches position A, shown in dotted lines in Fig. 7. Upon cam member 84 being moved in this direction, the eccentricity of cam member 84 takes effect causing the bed 25 and carrier 27 to move relative to the frame 21 toward the cutting tool 22, an amount equal to the eccentricity of the cam member 84. This relative movement of the carrier and bed toward the tool, causes the work piece 20' to be disposed in the cutting plane of the tool 22. The cam member 84 is limited in its clockwise movement by a limit pin 100 which is mounted vertically on bed 25. When the cam member 84 is in position A, leaf spring 92a engages the adjacent side of sleeve 93 and effects positive engagement between the shoe 94 and the rail 96.

Upon movement of the carrier 27 back to its initial starting position, as seen in Fig. 1, the frictional engagement between rail 96 and shoe 94 causes the cam member 84 to be rotated from the position A to position B, as seen in Fig. 7. This rotatable movement of the cam member 84 in a counterclockwise direction about stud 86 causes the eccentricity of the cam member to have the reverse effect on the bearing housing 82 and results in the bed and carrier backing away from the cutting plane of tool 22. Leaf spring 92b reacts with sleeve portion 93, when the cam member 84 is in position B and effects positive engagement between the rail 96 and shoe 94. Only a relatively small linear movement of the carrier 27 with respect to the bed 25 is required to cause the cam member 84 to move from position A to position B, thus, the work piece 20' assumes a backed-off position relative to the cutting tool before it passes the latter on the return of the carrier to its initial starting position. A pair of stop pins 102 and 103 are provided for leaf springs 92a and 92b, respectively, and extend upwardly from the bed 25, and are disposed on opposite sides of the sleeve portion when the latter is midway between position A and B as seen in Fig. 7. A downwardly extending tongue 99 formed on the free end of each leaf spring engages the upper end of one of the stop pins 102 and 103. The upper ends of the stop pins are disposed beneath the sleeve portion 93 of the cam member 84. Thus, the movement of the leaf springs 92a and 92b is restricted to the sectors formed between limit pin 100 and stop pin 102, and limit pin 101 and stop pin 103, respectively.

Mounted on the upper surface of work-supporting plate 39 and adjacent the forward edge thereof is a work- aligning unit 104. The unit 104 comprises a track 105 and a gauge assembly 106 slidably mounted on said track for movement longitudinally thereof.

The track 105 is mounted at substantially a right angle with respect to the clamp bar 52 and in this instance comprises a plurality of elongated pieces arranged in superposed relation and secured together by a rivet 109, as seen in Fig. 16. The top track piece 108 has a pair of opposite edges 110 and 111 serrated. Scales 112 and 113 are provided on the upper exposed surface of piece 108 and are disposed adjacent edges 110 and 111, respectively. Scale 112 and edge 110 are calibrated into pica units and scale 113 and edge 111 are calibrated into sixteenth of an inch units.

The gauge assembly 106, as seen more clearly in Figs. 9-15, comprises a housing 114 which embraces the top and serrated side portions of track 105. The front end 115 of the housing 114 is tapered, as seen in Fig. 9, and is provided with a cutout portion 116 to facilitate observing of scales 112 and 113. A pair of indicators 109 project into the cutout portion 116 and one of said indicators cooperates with each of the scales 112 and 113. Mounted forwardly of the tapered end 115 of the housing is work-abutting plate 117 which is adapted to engage the edge of the work piece 20', opposite from the edge of said work piece being trimmed by the tool 22.

Rotatably mounted within housing 114 are a pair of worm gears 118 and 120. The worm gears are mounted on shafts 121 and 122, respectively, which are inclined upwardly, as seen in Fig. 10, and have the upper ends thereof slightly convergent with respect to one another, as seen in Fig. 9. The shafts 121 and 122 are supported by a bearing plate 123 disposed within the housing 114 and pivotally mounted thereto at point 124. Pivotal adjustment of bearing plate 123 is effectuated by a rack gear 125 which meshes with a spur gear 126 (see Figs. 9 and 12) the latter being keyed to a spindle 127 which extends upwardly through the upper side of housing 114 and has the end thereof terminating in a handle grip 128.

The rack gear 125 is mounted within an elongated slot 130, see Fig. 12, formed in bearing plate 123. The opposite ends of the rack gear are engaged by spring-actuated buttons 131a and 131b which project into the elongated slot 130. The buttons 131a and 131b are disposed within cavities 133 and 134, respectively, formed in bearing plate 23. Coil springs 132a and 132b are likewise disposed in these cavities and cause the buttons 131a and 131b, respectively, to positively engage the rack gear 125.

Upon movement of the handle 128 approximately 15° in a counterclockwise direction about spindle 127, as seen in Fig. 9, the worm gear 120 is caused to mesh with the serrated edge 111 of track piece 108. Movement of the handle 128 approximately 15° in a clockwise direction from the position shown in Fig. 9 will cause the worm gear 118 to mesh with the serrated edge 110 of track piece 108. Only worm gear 118 or 120 may be in meshing engagement with the corresponding serrated edge of track 105 at any one time, depending on the relative position of the handle 128. If upon rotating the handle 128 in either a clockwise or counterclockwise direction, the grooves of the meshing worm gear are out of registration with the teeth of the serrated edge, the coil spring 132a or 132b, not adjacent the non-registering worm gear, will become compressed and upon slight movement of the gauge assembly 106 forward or backward of the track 105, the worm gear will snap into meshing relation with the adjacent serrated edge. When the handle 128 is in its neutral position, as shown in Fig. 9, neither gear 118 nor 120 is in meshing engagement with track piece 108 thereby enabling the operator, by hand, to readily slide the gauge assembly along the track 105.

Keyed to the upper ends of shafts 121 and 122 are a pair of indicator drums 135 and 136, respectively, having the peripheral edges thereof provided with vernier scales. The scale on drum 135 is calibrated in fractional pica units and the scale on drum 136 in fractional inch units. Mounted on shafts 121 and 122 and adjacent indicator drums 135 and 136 are spur gears 137 and 138, respectively. Due to the convergence of the upper ends of shafts 121 and 122, spur gears 137 and 138 are in continuous meshing engagement with each other. The upper end of shaft 122 projects beyond the rear end of housing 114 and has affixed thereto a knob 140 which enables the operator to readily impart rotational movement to shafts 121 and 122 and effect minute movement of the assembly along the track 105.

The scales provided on drums 135 and 136 are observable through windows 143 and 144, respectively, formed on the upper surface of housing 114.

Mounted within housing 114 and positioned forwardly of drums 135 and 136 are a pair of spring biased buttons 141, only one being shown in Fig. 10. The shank portion of each button is adapted to engage the front face of the adjacent drum, when the worm gear, mounted on the same shaft as the adjacent drum, is in meshing relation with the track 105. The front face of each drum, adjacent the button 141, is provided with a plurality of dimples or notches 142 arranged symmetrically about the axis of the drums. The dimples are spaced a predetermined distance apart so that the peripheral spacing between the dimples represents a particular number of units on the vernier scale of the drum. Thus, the button engaging the dimples provides a means by which the operator can readily tell, by feel, when the housing 114 has moved a predetermined distance along the track 105.

Thus, it will be seen that a machine has been provided for trimming printing plates and the like to specified dimensions which is simple in construction, inexpensive to produce, and may be readily and effectively operated by one not skilled in the art of trimming plates. The trimmed surfaces of the work are smooth when cut by the machine and thereby facilitate mounting of the work in a chase for a printing machine. Furthermore, the cutting load on the cutting tool has been more widely distributed along the peripheral surface of the tool thereby prolonging the effective life of the cutting tool.

While the several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. An apparatus of the class described comprising a frame, a cutter rotatably mounted on said frame, a bed adjustably mounted on said frame for movement to a predetermined position in close proximity to said cutter, a work carrier mounted on said bed for linear relative movement past said cutter, said carrier having a substantially flat work-supporting surface angularly disposed with respect to the direction of travel of said carrier, an elongated clamping bar mounted on said work-supporting surface adjacent said cutter for independent movement towards or away from said surface only when said carrier is in a particular position relative to said bed, and a work-sighting device mounted on said bar and disposed intermediate said bar and work-supporting surface and movable independently thereof; said device having a portion thereof adapted to assume a substantially tangential relation with respect to said cutter when said bar is moved away from said supporting surface.

2. An apparatus of the class described comprising a frame, a cutter rotatably mounted on said frame, a bed adjustably mounted on said frame for movement to a predetermined position in close proximity to said cutter, a work carrier mounted on said bed for linear movement past said cutter, said carrier having a subtantially flat work-supporting surface angularly disposed with respect to the direction of travel of said carrier, said surface having one edge thereof disposed adjacent said cutter and in a plane parallel to a tangential plane of said cutter, means mounted on said frame and operatively connected to said bed and carrier and actuated by the latter for automatically effecting unitary movement of said bed and carrier toward the rotatory axis of said cutter upon relative linear movement of said carrier in one direction, work-clamping means mounted on said work-supporting surface and being actuated into and out of clamping relation only when said carrier is in a particular relative position with respect to said bed, and an elongated sight device mounted on said clamping means and movable independently thereof, said sight device having one edge thereof adapted to assume a substantially tangential relation with respect to said cutter only when said clamping means is in an unclamped position.

3. An apparatus of the class described comprising a frame, a cutter rotatably mounted on said frame, a bed adjustably mounted on said frame for movement to a predetermined position in close proximity to said cutter, a work carrier mounted on said bed for relative linear movement past said cutter, said carrier having a substantially flat work-supporting surface angularly disposed with respect to the direction of travel of said carrier, said surface having one edge thereof disposed adjacent said cutter and in a plane parallel to a tangential plane of said cutter, means mounted on said frame and operatively connected to said bed and carrier and actuated by the latter for automatically effecting unitary movement of said bed and carrier toward the rotatory axis of said cutter upon relative linear movement of said carrier in one direction past said cutter, work-clamping means adjustably mounted on said work-supporting surface for movement into and out of clamping relation only when said carrier is in a particular relative position with respect to said bed, and work-sighting means mounted on said clamping means and movable independently thereof; said sighting means comprising a cam element mounted on the work-supporting surface of said carrier, a sight piece adjustably mounted on said clamping means intermediate said clamping means and said work-supporting surface, and a cam follower adjustably mounted on said clamping means and connected to said sight piece and contacting said cam element for effecting independent movement of said sight piece relative to said clamping means upon movement of the latter into and out of clamping relation.

4. An apparatus of the class described comprising a frame, a cutter rotatably mounted on said frame, a bed adjustably mounted on said frame for movement to a predetermined position in close proximity with said cutter, a work carrier slidably mounted on said bed for independent linear forward and rearward movement past said cutter, said carrier having a substantially flat work-supporting surface inclined with respect to the direction of travel of said carrier whereby the portion of the edge of the carried work engaged by the cutter moves relative to the cutter in a direction axially of the latter upon movement of said work carrier past said cutter, a work-clamping unit adjustably mounted on said carrier adjacent said cutter and disposed in spaced substantially parallel relation with respect to a tangential plane of said cutter for movement toward and away from said work-supporting surface, and a work-sighting device mounted on said clamping unit intermediate said unit and said work-supporting surface and movable independently thereof; said device having an edge portion thereof substantially disposed in the tangential plane of said cutter only when said clamping unit is moved away from said supporting surface.

5. An apparatus of the class described comprising a frame, a cutter rotatably mounted on said frame, a bed adjustably mounted on said frame for movement to a predetermined position in close proximity with said cutter, a work carrier slidably mounted on said bed for independent linear forward and rearward movement past said cutter, said carrier having a substantially flat work-supporting surface angularly disposed with respect to the direction of travel of said carrier, and work-aligning means adjustably mounted on said supporting surface; said means comprising an elongated element mounted on said surface and disposed at substantially a right angle with respect to the direction of travel of said carrier, said element having a pair of substantially parallel side edges provided with a plurality of serrations, a work-abutting member mounted on said element for independent movement longitudinally thereof, gears rotatably mounted on said member, one of said gears being disposed adjacent each of the serrated side edges of said element, and supporting means for said gears pivotally mounted on said member, said supporting means upon pivoting thereof in one direction effecting meshing engagement of only one of said gears with the corresponding serrated side edge of said element and upon pivoting thereof in the opposite direction effecting meshing engagement of only the other of said gears with the other corresponding serrated side edge of said element.

6. An apparatus of the class described comprising a frame, a cutter rotatably mounted on said frame, a bed adjustably mounted on said frame for movement to a predetermined position in close proximity with said cutter, a work carrier slidably mounted on said bed for independent linear forward and rearward movement past said cutter, said carrier having a substantially flat work-supporting surface angularly disposed with respect to the direction of travel of said carrier, and work-aligning means mounted on said supporting surface for movement independently thereof; said means comprising an elongated element mounted on said surface and disposed at substantially a right angle with respect to a tangential plane of said cutter, said element having a pair of side edges provided with a plurality of serrations, a calibrated scale for each of said serrated side edges disposed on the top surface of said element, one of said scales and the corresponding serrated side edge being calibrated in inch units and the other scale and corresponding serrated side edge being calibrated in pica units, a work-abutting member slidably mounted on said elongated element for movement longitudinally thereof having a pair of indicators formed thereon, one of said indicators cooperating with each of said scales, a gear disposed adjacent each of said serrated side edges, means pivotally mounted on said member for rotatably supporting said gears and adapted, when in one position of pivotal adjustment, to effect meshing engagement of only one of said gears with the corresponding serrated edges of said element and when in a second position of pivotal adjustment to effect meshing engagement of only the other gear with the other corresponding serrated side edge, and manually adjustable means operatively connected to said gears for effecting simultaneous rotation thereof.

7. An apparatus of the class described comprising a frame, a cutter rotatably mounted on said frame, a bed adjustably mounted on said frame for movement to a predetermined position in close proximity with said cutter, a work carrier slidably mounted on said bed for independent linear forward and rearward movement past said cutter, said carrier having a substantially flat work-supporting surface angularly disposed with respect to the direction of travel of said carrier, and work-aligning means mounted on said supporting surface for movement independently thereof in a direction substantially perpendicular to the direction of travel of said carrier; said means comprising an elongated element mounted in a fixed position on said work-supporting surface and disposed substantially perpendicular to the direction of travel of said carrier, said element having a pair of opposite edges thereof provided with a plurality of serrations, a scale mounted on the exposed top surface of said element and adjacent each of said serrated side edges, a work-abutting member mounted for longitudinal adjustment on said element, gears rotatably mounted on said work-abutting member and having one of said gears disposed adjacent each of said serrated side edges, said gears being laterally adjustable as a unit relative to said element to either effect meshing of one or the other of said gears with the corresponding serrated edge of said element or effect both gears being simultaneously out of meshing engagement with the serrated side edges, means adjustably mounted on said member and in cooperative engagement with said gears for selectively effecting lateral movement thereof, and manually adjustable means operatively connected to said gears for effecting rotation of said gears and controlled longitudinal movement of said work-abutting member relative to said element, when one or the other of said gears is in meshing relation with one of said serrated side edges.

8. An apparatus of the class described comprising a frame, a cutter rotatably mounted on said frame, a bed adjustably mounted on said frame and defining a supporting plane, a work carrier slidably mounted on said supporting plane for linear movement thereon past said cutter, said carrier having a work-engaging surface disposed at an acute angle to said supporting plane, the plane of said work-engaging surface intersecting said supporting plane along a line disposed substantially perpendicular to the direction of movement of said carrier relative to said bed, and means mounted on said frame and bed and operatively connected to said carrier for automatically effecting unitary movement of said bed and carrier toward and away from the rotary axis of said cutter upon slidable movement of said carrier relative to said bed in one direction past said cutter; said means comprising a stationary element secured to said frame, and a rotary element mounted eccentrically on said stationary element and secured to said bed, said rotary element having a portion thereof frictionally engaging said carrier and being actuated thereby; movement of said rotary element in one direction relative to said stationary element effecting greater eccentricity and unitary movement of said bed and carrier toward said cutter.

9. An apparatus of the class described comprising a frame, a cutter rotatably mounted on said frame, an adjustable bed mounted on said frame and defining a supporting plane, a work carrier mounted on said supporting plane for independent linear movement relative thereto past said cutter, said carrier having a work-engaging surface angularly disposed with respect to said supporting plane, the plane of said work-engaging surface intersecting said supporting plane along a line substantially perpendicular to the direction of travel of said carrier, the angularity of said work-engaging surface relative to the axial length of said cutter being such that, as the carrier moves in one direction relative to said cutter along said supporting plane, successive longitudinal adjacent edge segments of said surface and the work carried thereon pass successive axially adjacent segments of the cutter periphery, and work clamping means mounted on said work-engaging surface of said carrier and being adjustable toward and away from said work-engaging surface only when said carrier is in a predetermined relative position with respect to said supporting plane.

10. An apparatus of the class described comprising a frame, a cutter rotatably mounted on said frame, a bed adjustably mounted on said frame for movement to a predetermined relative position with respect to the rotatory axis of said cutter and defining a supporting plane, a pair of ways mounted in spaced relation on said supporting plane, a work carrier slidably mounted on said ways for movement past said cutter, said carrier having a substantially flat work-supporting surface disposed at an acute angle with respect to said supporting plane, the plane of said surface intersecting said supporting plane along a line disposed substantially perpendicular with respect to the direction of travel of said carrier whereby successive longitudinally adjacent edge segments of said surface and the work carried thereon pass successive axially adjacent peripheral segments of said rotating cutter, and means actuated by said carrier upon slidable movement thereof mounted on said frame and bed supporting surface intermediate said ways for automatically effecting unitary movement of said bed and carrier from the predetermined relative position of said bed toward the rotatory axis of said cutter upon slidable movement of said carrier in one direction with respect to said bed past said cutter, and unitary movement of said bed and carrier back to the predetermined relative position of said bed upon slidable movement of said carrier in a reverse direction with respect to said bed and past said cutter.

References Cited in the file of this patent
UNITED STATES PATENTS

| Number | Name | Date |
|---|---|---|
| 212,754 | Smith | Feb. 25, 1879 |
| 401,942 | Gowen | Apr. 23, 1889 |
| 418,292 | Manning | Dec. 31, 1889 |
| 513,031 | Caps | Jan. 16, 1894 |
| 598,257 | Royle | Feb. 1, 1898 |
| 600,225 | Heywood | Mar. 8, 1898 |
| 737,251 | Leetham | Aug. 25, 1903 |
| 937,057 | Edgar | Oct. 19, 1909 |